United States Patent [19]

Matlack et al.

[11] Patent Number: 5,028,462

[45] Date of Patent: Jul. 2, 1991

[54] MOLDED BOTTLES AND METHOD OF PRODUCING SAME

[75] Inventors: John D. Matlack, Lilburn; James G. Villanueva; Bruce A. Newman, both of Snellville, all of Ga.; Lawrence D. Lillwitz, Glen Ellyn; Melvin L. Luetkens, Jr., Batavia, both of Ill.

[73] Assignee: Amoco Corporation, Chicago, Ill.

[21] Appl. No.: 383,186

[22] Filed: Jul. 21, 1989

[51] Int. Cl.$^5$ .................... B65D 1/02; B32B 27/34
[52] U.S. Cl. .................. 428/35.7; 264/513; 264/516; 428/36.7; 428/474.4
[58] Field of Search ............. 528/338, 339; 428/35.7, 428/36.7, 474.4, 475.2, 476.3; 264/513, 516

[56]  References Cited

U.S. PATENT DOCUMENTS

| | | | |
|---|---|---|---|
| 2,715,620 | 8/1955 | Carlston et al. | 260/78 |
| 2,742,496 | 4/1956 | Lum et al. | 260/501 |
| 2,766,222 | 10/1956 | Lum et al. | 260/78 |
| 3,379,695 | 4/1968 | Wolfes et al. | 260/78 |
| 3,475,387 | 10/1969 | Carter et al. | 260/78 |
| 4,018,746 | 4/1977 | Brinkman et al. | 260/78 R |
| 4,133,802 | 1/1979 | Hachiboshi et al. | 528/502 |
| 4,250,297 | 2/1981 | Nielinger et al. | 528/340 |
| 4,398,642 | 8/1983 | Okudaira et al. | 215/1 C |
| 4,501,781 | 2/1985 | Kushida et al. | 428/35 |
| 4,535,901 | 8/1985 | Okudaira et al. | 215/1 C |
| 4,603,193 | 7/1986 | Richardson et al. | 528/342 |
| 4,728,549 | 3/1988 | Shimizu et al. | 428/35 |
| 4,800,129 | 1/1989 | Deak | 428/474.4 |
| 4,831,108 | 5/1989 | Richardson et al. | 528/335 |
| 4,908,272 | 3/1990 | Harada et al. | 428/476.9 |

FOREIGN PATENT DOCUMENTS 60-240452 11/1985 Japan.

OTHER PUBLICATIONS

Bulletin by Toyobo Co., Ltd., titled "Toyobo Nylon MXD6".
ASTM D3417.
ASTM D3418.

*Primary Examiner*—James J. Seidleck
*Attorney, Agent, or Firm*—Robert G. Ladd; William H. Magidson; Ralph C. Medhurst

[57] ABSTRACT

Plastic bottles and a process for producing same in which at least one layer comprises a polyamide composition comprising isophthalic acid, terephthalic acid, adipic acid, metaxylylenediamine and hexamethylenediamine moieties in a molar ratio of about 49.5-0.5-/0-20/0.5-49.5/0.5-50/49.5-0.

31 Claims, No Drawings

MOLDED BOTTLES AND METHOD OF PRODUCING SAME

FIELD OF THE INVENTION

The present invention relates to injection molded bottles comprising polyamide compositions having excellent gas barrier properties, high transparency and resistance to whitening and hazing and a method for producing same. More specifically, it relates to multi-layer bottles comprising an inner and an outer layer of a thermoplastic resin and at least one intermediate layer of a polyamide composition comprising recurring hexamethylene and metaxylylene isophthalamide, adipamide and, optionally, terephthalamide units in proportions such that the compositions have a high degree of transparency and resistance to whitening and hazing.

BACKGROUND OF THE INVENTION

Thermoplastic polyester resins, mainly polyethylene terephthalate, are widely used for various containers and packaging materials in the form of film and sheet because of their excellent mechanical properties, gas barrier properties, chemical resistance, scent maintenance and hygienic qualities. With the development of blow-molding techniques, especially biaxial orientation blow-molding techniques, these resins are frequently employed for the production of hollow vessels such as bottles.

While such bottles have utility in a wide range of packaging applications, such as containers for soft drink beverages and mouth wash, it would be desirable to extend their utility. For example, utility of bottles consisting of polyester resins for packaging various types of foods is limited because of such resins' barrier properties against oxygen. Providing such bottles with improved barrier properties would reduce exposure of such food products to oxygen, thereby prolonging shelf life.

Various amorphous polyamide compositions and utility thereof in a wide range of applications are well known. Such compositions are generally characterized by a high degree of transparency and lack of a sharply defined melting point. Applications for such compositions include films, sheets, laminates and molded articles. A disadvantage of some of these compositions is their relatively poor thermal properties which limits their utility to relatively low temperature applications.

An example of such a composition, disclosed in U.S. Pat. Nos. 2,715,620 and 2,742,496, is a polyamide of isophthalic acid and hexamethylenediamine. As reported in U.S. Pat. No. 4,250,297, however, such compositions have poor dimensional stability at elevated temperatures. That patent proposed to overcome such difficulties by replacing part of the hexamethylenediamine with an isomer mixture of 2,2,4- and 2,4,4-trimethylhexamethylenediamine.

Amorphous polyamides based on terephthalic acid and isophthalic acid or their derivatives and hexamethylenediamine also are known as reported in U.S. Pat. No. 3,379,695 and U.S. Pat. No. 3,475,387. While such compositions exhibit improved heat deflection temperatures relative to the isophthalic acid and hexamethylenediamine polyamides, transparency of articles prepared from the compositions suffers and crystallization of the polymer can occur during use of the articles at elevated temperatures if the mol ratio of isophthalic acid to terephthalic acid is too low.

U.S. Pat. No. 2,766,222 discloses transparent compositions prepared from isophthalic acid or isophthalic acid/terephthalic acid mixtures and metaxylylenediamine and that such compositions are suitable for production of molded articles of high transparency, good heat and chemical resistance and excellent tensile and impact strengths. Softening points of 150°–170° C. for such compositions are reported in the examples. It also is disclosed that transparency of the compositions suffers if greater than about 40 mol % isophthalic acid is replaced with terephthalic acid.

U.S. Pat. No. 4,018,746 also is directed to transparent metaxylylenediamine-based compositions, disclosing polyamides prepared from a mixture of straight chain aliphatic diamines of 4–20 carbon atoms and metaxylylenediamine or a mixture of metaxylylenediamine and paraxylylenediamine and a mixture of a saturated aliphatic dicarboxylic acid of 5–20 carbon atoms and at least one aromatic dicarboxylic acid selected from terephthalic acid and isophthalic acid. Aliphatic diamine content of the diamine mixture is said to range from 5–90 mol % and aliphatic acid content of the acid mixture is said to range from 10–90 mol %. The polyamides are said to be useful in preparation of transparent articles such as sheets, plates, tubes, wire coverings and injection molded technical parts.

Utility of metaxylylenediamine group-containing polyamides in molded containers and vessels is disclosed in U.S. Pat. No. 4,398,642 directed to a multi-ply vessel comprising an inner layer of polyester resin, a middle layer composed of a metaxylylene group-containing polyamide resin and an outer layer composed of a synthetic resin having impermeability to moisture. The metaxylylene group-containing polyamide middle layer is said to provide gas barrier properties. However, the glass transition temperature of the metaxylylene polyamide is about 80° C., such that vessels prepared therefrom are susceptible to deformation at elevated temperatures including those to which the vessels may be exposed during hot filling processes.

U.S. Pat. No. 4,535,901 discloses a multi-ply vessel comprising an odd number of layers with the innermost and outermost layers of polyester resin, and at least one middle layer composed of a metaxylylene group-containing polyamide. The middle layer is covered completely by both inner and outer layers to provide good water resistance, high chemical resistance and high hygienic qualities.

It also is known that water absorption lowers the glass transition temperature, Tg, and the crystallization temperature of non-oriented metaxylylene polyamide resin. This effect is observed as a haze in the non-oriented neck portions of multilayer bottles having such resins as the inner gas barrier layer. In areas of monolayer or multi-layer bottles containing metaxylylene/adipic acid polymer with little or no orientation, these areas have a tendency to whiten or become hazy in the presence of moisture. According to a statement in a product bulletin entitled "Toyobo Nylon MXD6" distributed by Toyobo Company, "When non-oriented MXD6 absorbs water from the air, it becomes white. The water absorption lowers glass transition temperature and crystallized temperature, and then makes MXD6 crystallized at room temperature. If the transparency is required for long periods, non-oriented products are not suitable. As far as the multilayer products (PET/MXD6/PET) are concerned the outside layers prevent MXD6 from absorbing water, making crystallization much slower."

U.S. Pat. No. 4,501,781 discloses that a gap may form between the inner surface layer and the intermediate layer resulting in a decrease of transparency of the container. The patent discloses the use of a mixture of polyethylene terephthalate resin and a xylylene group-containing polyamide resin.

Japanese Patent Applications 60-232,952, 60-238,355 and 60-240,452 disclose copolymers of metaxylylenediamine with adipic acid and isophthalic acid containing 30 to 100% isophthalic acid and polyester laminated moldings consisting of a copolymer layer and a polyethylene terephthalate layer.

U.S. Pat. No. 4,728,549 discloses a biaxially oriented multilayered container comprising a wall portion consisting of at least two metaxylylene group-containing polyamide resin layers and one more polyethylene terephthalate layer than the number of metaxylylene group-containing polyamide layers with the terminal portion of the mouth opening being polyethylene terephthalate.

U.S. Pat. No. 4,800,129 discloses thermoformed multilayer structures comprising at least a first and a second layer, the first layer comprising a blend of amorphous polyamides having a Tg greater than about 120° C. and one or more semicrystalline aliphatic polyamide and the second layer comprising a structural thermoplastic resin.

European Patent Application 0 212 339 discloses a method for making a hollow two-layer blow-molded bottle having one layer formed of a biaxially oriented polyethylene terephthalate resin and a second layer formed of a mixture of polyethylene terephthalate resin and 5 to 50 percent by weight of a xylene derivative polyamide resin.

European Patent Application 0 186 154 discloses a nine-layer parison, process for its production and a multilayer container produced from the parison wherein the nine-layer structure is composed of two outside layers and one central layer of polyethylene terephthalate (PET) and two interlayers of a metaxylylenediamine (MXDA) nylon with four adhesive layers of a thermoplastic adhesive resin being positioned between the PET layers and the MXDA nylon layers. This process requires adhesive layers between the PET and MXDA nylon layers.

European Patent Application 0 288 972 discloses a multilayered structure having at least one layer of a copolyamide composed of 55 to 70 mol % of an aliphatic dicarboxylic acid component and 45 to 30 mol % of an aromatic dicarboxylic acid component and a diamine component consisting substantially of metaxylylenediamine. The copolyamides of this patent have relatively high levels of an aliphatic dicarboxylic acid such as adipic acid and use metaxylylenediamine as the diamine component.

U.S. Pat. No. 4,133,802 discloses a biaxially drawn film of a polyamide containing a metaxylylene group which has excellent mechanical and physical properties including a high gas barrier property.

Despite the foregoing, there remains a need for bottles with improved barrier, hot-fill properties and resistance to whitening or hazing upon exposure to moisture and a process for making same.

An object of the present invention is to provide molded bottles having gas properties against oxygen without losing properties of a thermoplastic polyester resin such as excellent mechanical properties, transparency, chemical resistance and the like.

Another object of the present invention is to provide such bottles having excellent dimensional stability and which resists "whitening" upon exposure to moisture.

A further object of the present invention is to provide a molded multilayer bottle having inner and outer layers comprising a thermoplastic resin and at least one intermediate or middle layer comprising a polyamide composition which exhibits improved gas barrier properties, resistance to whitening upon exposure to moisture and ease of processing.

These and other objects and advantages of the present invention will be apparent to those skilled in the art from the following description.

We have now found that the objects of this invention can be obtained by providing bottles comprising a polyamide composition having excellent oxygen barrier properties. Advantageously, such polyamide compositions also are easily melt processed under conditions and with equipment used in the manufacture of PET bottles and thus are well suited for use in making multilayered bottles comprising inner and outer layers of thermoplastics such as PET or polycarbonate and at least one intermediate layer comprising such polyamide compositions. In one embodiment, the bottles comprise a polyamide composition which have glass transition temperatures of 90° C. or greater and oxygen transmission rates of about 2.0 cc-mil/100 in$^2$-day-atm or less. The oxygen barrier properties of the invented bottles approach those of bottles having only a metaxylylenediamine polyamide component and the bottles retain excellent clarity even after exposure to high humidity conditions.

SUMMARY OF THE INVENTION

Bottles according to this invention comprise a polyamide composition comprising the following recurring units:

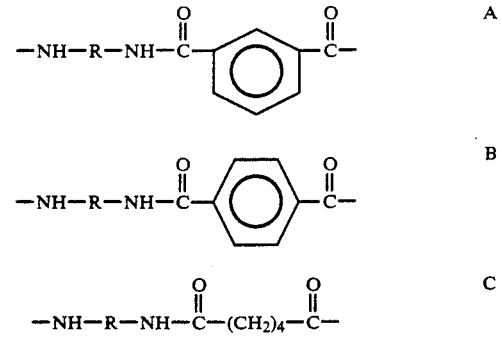

in proportions such that the mole ratio of the dicarboxylic acid moieties in the A, B and C units is about 49.5–0.5/0–20/0.5–49.5 and wherein R is a divalent radical comprising

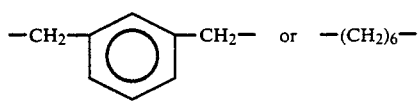

provided that said radicals

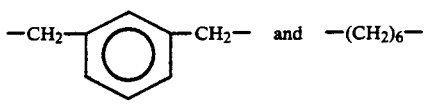

are present in the A, B and C units in a mole ratio of about 0.5-50/49.5-0. Monolayer and multilayer bottles having improved resistance to oxygen permeability can be formed from these polyamide compositions.

One embodiment of bottles which can be made according to the present invention has a multilayer structure comprising at least two kinds of synthetic polymeric resins. The multilayer bottle has an inner layer and an outer layer comprising a thermoplastic resin and at least one intermediate layer comprising a polyamide composition with the inner, intermediate and outer layers being oriented in at least one direction at the thin part of the vessel wall. The present invention includes bottles with the polyamide composition resin blend used in at least one layer.

Polyamide compositions useful for one or more intermediate layers of multilayer bottles can be a copolyamide of isophthalic acid (IA), terephthalic acid (TA), adipic acid (AA), metaxylylenediamine (MXDA) and hexamethylenediamine (HMDA) in a molar ratio of about 49.5-0.5/0-20/0.5-49.5/0.5-50/49.5-0. The polyamide compositions can also be a miscible blend of about 99 to about 1 weight percent of an amorphous polyphthalamide having isophthalic acid, terephthalic acid and hexamethylenediamine moieties in a molar ratio of about 50-27.5/0-22.5/50 and about 1 to about 99 weight percent of a metaxylylenediamine-containing polyamide (hereinafter denoted as MXDA resin) having adipic acid, isophthalic acid and metaxylylenediamine moieties in a molar ratio of about 50-35/0-15/50.

The miscible blends can also be obtained by blending appropriate amounts and types of homopolymers and/or copolymers of isophthalic acid and/or adipic acid and/or, optionally, terephthalic acid with metaxylylenediamine and, optionally, hexamethylenediamine such that the molar ratio for IA/TA/AA/MXDA/HMDA is about 49.5-0.5/0-20/0.5-49.5/0-.5-50/49.5-0.

Also in accordance with the present invention, a process for producing a plastic bottle comprises forming a multilayer parison having a multi-ply structure of an inner layer and an outer layer composed of a thermoplastic resin and at least one intermediate layer composed of a polyamide composition comprising the following recurring units:

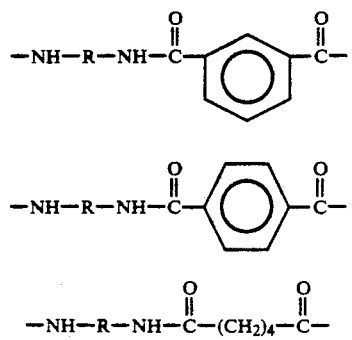

in proportions such that the mole ratio of the dicarboxylic acid moieties in the A, B and C units is about 49.5-0.5/0-20/0.5-49.5 and wherein R is a divalent radical comprising

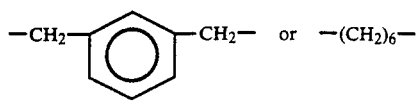

provided that said radicals

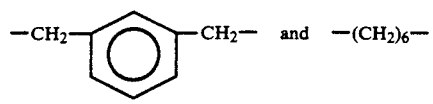

are present in the A, B and C units in a mole ratio of about 0.5-50/49.5-0, and blow-molding the multilayer parison thus formed at a draw ratio of 1.1 to 3.0 times in longitudinal directional.

As the thermoplastic resin which composes the inner and outer layers of the bottle of the present invention, a conventional fiber-forming polyester resin or a polycarbonate can be used. Particularly, a polyester having repeating units consisting predominantly of ethylene terephthalate known as polyethylene terephthalate (PET) is preferable.

The PET resin having repeating units consisting predominantly of ethylene terephthalate includes polyesters consisting of units comprising 80 mol % or more, preferably 90 mol % or more, of esterified terephthalic acid and glycol components comprising 80 mol % or more, preferably 90 mol % or more, of ethylene glycol. The acid components other than terephthalic acid are a member selected from isophthalic acid, diphenyl ether-4,4'-dicarboxylic acid, naphthalene-1,4- or 2,6-dicarboxylic acid, adipic acid, sebacic acid, decane-1,10-dicarboxylic acid, hexahydroterephthalic acid and the like and other glycol components include propylene glycol, 1,4-butanediol, neopentyl glycol, diethylene glycol, cyclohexane dimethanol, 2,2-bis(4-hydroxyphenyl)propane, 2,2-bis(4-hydroxyethoxyphenyl)propane and the like. The thermoplastic polyester resin may also contain an oxy-acid component such as p-hydroxybenzoic acid, p-hydroxyethoxybenzoic acid and the like. The thermoplastic polyester resin may be used in a blend of two or more polyester resins, as far as the content of ethylene terephthalate is in the range mentioned above. The inherent viscosity of the thermoplastic polyester resin can be between about 0.55 to about 1.10 dl/g, preferably about 0.70 to about 0.85 dl/g for ease of processing.

The thermoplastic resin used for the outer layer formed on the multilayer parison is a synthetic resin which does not prevent orientation and blow-molding of the thermoplastic resin used for the inner layer such as PET or polycarbonate. In order to obtain the desired transparency and other properties of the bottle, a thermoplastic polyester resin, particularly, one having repeating units consisting predominantly of ethylene terephthalate and having an inherent viscosity of 0.55 dl/g or more is preferred. The resin may be optionally combined with additives such as colorants, ultraviolet absorbers, antistatic agents, agents for preventing deterioration of properties due to heat and oxidation, lubricants, anti-blocking agents, agents for providing metallic sheen and the like.

As noted above, an intermediate layer of such multilayer bottles comprises a polyamide composition which can be prepared directly by condensation of acid and diamine components in suitable proportions or by blending of homopolymer and/or copolymer components to achieve the appropriate compositions. In the latter embodiment, examples of the MXDA resin are homopolymers such as polymetaxylyleneadipamide, and copolymers prepared from adipic acid, metaxylylenediamine, and other copolymerizable monomers such as aliphatic diamines (e.g., hexamethylenediamine and trimethylhexamethylenediamine), and aromatic dicarboxylic acids (e.g., terephthalic acid and isophthalic acid). The preferred MXDA resin used in the miscible blend method of preparing the polyamide compositions is a copolymer of adipic acid and, optionally, isophthalic acid and metaxylylenediamine in a molar ratio of about 50-35/0-15/50. A more preferred MXDA resin has a molar ratio of 45-35/5-15/50 for AA/IA/MXDA. The MXDA resin can be prepared by any suitable means for copolymerizing polyamides containing adipic acid, isophthalic acid and metaxylylenediamine components.

The amorphous polyphthalamides useful in the miscible polyamide blend method of preparing the polyamide composition used in this invention are those which are lacking in crystallinity as shown by the lack of an endotherm crystalline melting peak in a Differential Scanning Calorimeter test as determined according to ASTM D3417 and whose Tgs are greater than about 120° C. as measured according to ASTM D3418. These amorphous polyphthalamides are prepared from at least one aliphatic diamine, isophthalic acid and, optionally, terephthalic acid. An example of aliphatic diamines which can be used to prepare the amorphous polyphthalamides is hexamethylenediamine. Minor amounts of other aliphatic diamines such as 2,2,4-trimethylhexamethylenediamine and 2,4,4-trimethylhexamethylenediamine can also be present. A preferred diamine is hexamethylenediamine. Examples of aromatic dicarboxylic acids which can be used to prepare the amorphous polyphthalamides are: isophthalic acid, terephthalic acid, and alkyl substituted iso- and terephthalic acids. Preferred dicarboxylic acids are isophthalic acid, terephthalic acid and mixtures of the two.

A preferred amorphous polyphthalamide composition has a molar ratio of isophthalic acid/terephthalic acid/hexamethylenediamine moieties of about 50-27.5-/0-22.5/50. Such compositions tend to show little or no crystallinity with the tendency for crystallization decreasing with increasing isophthalic acid content. With greater than about 45 mol % of the acid component being terephthalic acid, the polyphthalamides can adversely affect transparency of bottles due to crystallization of such polyphthalamides.

One method of obtaining the miscible blends that form these polyamide compositions is by extrusion melt blending of the MXDA resins and amorphous polyphthalamides described above. The melt blend of MXDA resin and amorphous polyphthalamide resin comprises a maximum of 99 weight percent amorphous polyphthalamide, preferably about 25 to about 75 weight percent amorphous polyphthalamide, and most preferably about 40 to about 60 weight percent of amorphous polyphthalamide based on the combined weight of MXDA resin and amorphous polyphthalamide. It has been found that blends of MXDA resin and amorphous polyphthalamides at these levels improve the oxygen barrier properties, the resistance to whitening and hazing in less oriented portions of the container and the oxygen barrier properties as the relative humidity increases.

The miscible polymer blend polyamide compositions used in at least one intermediate layer of the multilayer bottles of this invention can be produced by mixing pellets of MXDA resin and pellets of amorphous polyphthalamide, heating the mixture with minimum exposure to air to a temperature at which the pellet mixture is thermally softened or melted, subjecting the mixture to a pressure in excess of 500 pounds per square inch and effecting turbulence and interkneading of the compounds with high shearing action to form a mixcible blend of the polymers.

The polyphthalamide component of the polyamide composition can be prepared from the appropriate acids and diamines in suitable proportions by any suitable means. One such preparation involves a salt preparation step, preferably conducted batchwise to achieve proper stoichiometry, wherein acids, diamines and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or in continuous mode. In the condensation section substantial conversion of salts to polymer takes place. The condensation product then typically is introduced into a finishing section, such as a twin-screw extruder, to obtain further conversion and generally increase inherent viscosity from a level of about 0.1 to about 0.6 dl/g achieved in the condensation section up to about 0.8 dl/g or greater. The polymeric product can be recovered from the finishing section and, for example, be pelletized or mixed with fillers, additives and the like. Commonly assigned U.S. Pat. Nos. 4,603,193 and 4,831,108 also disclose preparation of such polyphthalamides.

The moisture content of the resins that make up the blend components and the miscible blend itself when processed should be low enough to avoid substantial foaming and degradation resulting in viscosity changes in the resins. Preferably, the moisture content should be about 50 to about 500 ppm and most preferably about 100 to about 200 ppm. Conventional drying equipment can be used to obtain these moisture levels.

The miscible blend polyamide composition may optionally be combined with additives such as antistatic agents, lubricants, anti-blocking agents, stabilizers, dyestuffs, pigments and the like.

The polyamide composition used for intermediate layers of the multilayer vessels of the instant invention can also be obtained by copolymerizing isophthalic acid, terephthalic acid, adipic acid, metaxylylenediamine and hexamethylenediamine in a preferred molar ratio of about 49.5-0.5/0-20/0.5-49.5/0.5-50/49.5-0. A more preferred copolymer composition has a molar ratio of 37.5-5/0-15/12.5-37.5/37.5-12.5/12.5-37.5 for IA/TA/AA/MXDA/HMDA. A most preferred copolymer composition has a molar ratio of 30-5/0-15/-15-30/30-20/20-30 for IA/TA/AA/MXDA/HMDA.

Such polyamide compositions and preparation thereof by direct copolymerization and by blending are disclosed in detail in commonly assigned application Ser. No. 383,185 entitled Polyamide Compositions Having Improved Gas Barrier Properties filed contemporaneously herewith.

Generally, the injection molded bottles of the present invention are produced by forming a monolayer or a multilayer bottle parison or preform and then orienting and blow-molding the parison. In order to obtain a desired bottle having excellent gas barrier properties and high transparency, the multilayer parison should also have good transparency and further the resin components at the thin parts of the bottle wall (mainly the body thereof) should be at least uniaxially oriented, and hence, the parison should be also at least uniaxially oriented in the production of such a bottle.

The outer layer of synthetic resin can be formed as an outer layer of a multilayer parison or can be formed on the blend layer after orientation and blow-molding of the parison as a finishing on the surface of the blend layer, coating the blend layer with a film, topcoating which is employed in certain kinds of glass and bottles, spray coating and the like. Preferably, the outer layer is formed on the multilayer parison and then the parison is oriented and blow-molded to produce the bottle.

In areas of monolayer or multilayer bottles containing metaxylylenediamine/adipic acid polymer with little or no orientation, these areas have a tendency to whiten or become hazy in the presence of moisture. According to a statement in a product bulletin entitled "Toyobo Nylon MXD6" distributed by Toyobo Company, "When non-oriented MXD6 absorbs water from the air, it becomes white. The water absorption lowers glass transition temperature and crystallized temperature, and then makes MXD6 crystallized at room temperature. If the transparency is required for long periods, non-oriented products are not suitable. As far as the multilayer products (PET/MXD6/PET) are concerned the outside layers prevent MXD6 from absorbing water, making crystallization much slower."

However, we have observed whitening in bottles containing MXD6 resin after hot liquid filling tests, oxygen transmission rate tests under humid conditions, shelf life tests with water and after storage at ambient conditions. The time required for whitening to occur ranges from less than 24 hours under hot liquid fill conditions to about 6-8 months for bottles stored at room temperature and relative humidity. Tests were conducted with bottle sets containing core layers of MXD6 resin, Selar PA 3426 (an amorphous polyamide by DuPont)/MXD6 resin blends and amorphous polyphthalamide/MXD6 resin blends. These tests showed that the whitening effect occurs within 48 hours in bottles containing only MXD6 resin as a core layer and that essentially no change was observed in the bottles containing the polyamide compositions over an eight week test period.

The monolayer or multilayer bottle of the present invention can be of any desired configuration and generally has a wall structure comprising a bottom or base with a continuous side wall extending from the bottom or base and terminating at an end of the bottle opposite the base or bottom so as to define an open space to permit filling of the bottle at such end. The bottle can be of generally cylindrical shape or can have other shapes such as trapezoidal, elliptical, etc. The open end of the bottle can be provided with a suitable finish adapted to receive a suitable closure or cap such as a screw or snap-on cap. These bottles can be produced by forming a monolayer or multilayer parison or preform by blow-molding the preform according to conventional methods. The bottle of this invention can be conveniently produced by a biaxial orientation blow-molding technique in which a preform is heated to an orienting temperature, expanded and oriented by a rod which moves axially in a metal mold and compressed air is blown into the preform to form the bottle. A multilayer preform can be produced by successively forming the multilayer structure step by step from the inner layer with a conventional injection molding machine or a molding machine having a plurality of equipment for melting and injection or by forming a bottom on a pipe having a multilayer structure formed with a multilayer extrusion molding machine.

The total thickness of the inner, middle and outer layers of the preform is generally about 80 to about 225 mils. The preferred total thickness of the preform is from about 130 to about 180 mils. If a layer of the preform is too thick, the resin to be used for the layer will hardly flow in a mold. If the total thickness of the layers is too large, the multilayer parison becomes opaque during formation of the middle and outer layers thereof, and/or an extremely high blowing pressure is required to form the multilayer bottle.

Parisons for multilayer bottles of about 8 fl. oz. to about 64 fl. oz. can be produced by coinjection molding. The multilayer parison thus obtained is heated to a orienting temperature and then expanded and oriented in a blow-mold to produce a biaxially oriented bottle. The orientation temperature is preferably from about 90° to about 155° C. The Tg of the polyamide composition used in the intermediate layer is close to that of PET. When the parison is heated to the above temperature range, expansion and orientation can be carried out without difficulty.

It is not desirable that the preheating temperature be lower than 90° C. since microvoids can form in the vessel due to cold orientation and the bottle can show pearly appearance of become opaque. Likewise, it is not desirable that the preheating temperature be higher than 155° C., since the polyester resin of the outer layer becomes opaque due to crystallization thereof and adhesion between the resin layers is lowered. The stretch ratio ranges for the multilayer bottles of this invention are preferably such that the ratio of bottle length to preform length is about 1.1 to about 3.0. The average ratio of bottle diameter to preform diameter taken at the largest bottle diameter suitably range from about 1.5 to about 4.5. The total expansion taken as the bottle length times bottle diameter can be about 3 to about 12 and the bottle surface area/preform surface area ratio can be about 3.0 to about 8.5.

In the multilayer bottle of the present invention, the intermediate layer is generally about 0.2 to about 24 mils, preferably, about 1 to about 4 mils in thickness. The total thickness of the inner, intermediate and outer layers is about 6 to about 40 mils. Further, the intermediate layer is preferably about 4 to about 60% of the total thickness, and most preferably, about 5 to about 20% of the total thickness.

The polyamide composition used to produce the multilayer bottle of the present invention has a higher Tg than that of the metaxylylenediamine/adipic acid polymer alone. Since the Tg is similar to that of the polyester resin, the polyamide composition is sufficiently oriented under orientation conditions for the polyester resin. A bottle having high transparency as well as excellent gas barrier properties and heat stability and, therefore, having high commercial value can be obtained.

The following examples further illustrate the present invention, although it will be understood that these examples are for purposes of illustration and are not intended to limit the scope of the invention.

EXAMPLE 1

A polyamide copolymer was prepared from isophthalic acid, terephthalic acid and hexamethylenediamine in a mole ratio of about 30/20/50 as follows:

To a stainless steel, stirred reactor having a heating oil jacket, referred to hereinbelow as the salt reactor, were added quantities of hexamethylenediamine, water (representing 35% of the total mass charged), isophthalic acid and terephthalic acid. About 1.3 mol % benzoic acid, based on total moles of diamine and diacids, was added as an endcapping agent. Zinc hypophosphite catalyst at a level of 800 ppm was added to the reactor. Once the salt reactor had been charged, it was purged with nitrogen and heated to 218° C. The pressure in the salt reactor was increased to 480 psig by first allowing the water in the salt to reach its equilibrium pressure and then adjusting with nitrogen. The average residence time in the salt reactor was about 100 minutes.

Upon leaving the salt reactor, the reactor contents, comprising an aqueous salt solution were passed through a 140 micron filter into a dual-headed Bran-Lubbe piston pump. Temperature through the pump was maintained at 218° C. and the pressure was increased to 1800 psig in the pump. Following the pump, the salt solution was passed through a preheat zone and heated to a temperature of 316° C. The elevated pressure prevented vapor formation in the salt solution as it passed through the preheater. The salt solution had a residence time in the preheater of 40 seconds.

The salt solution was introduced into a flash reactor through a control valve manufactured by Research Control Valve (RCV) where the pressure was reduced from 1800 psig to 400 psig. Wall temperatures in the flash reactor were kept at 399° C. using electrical heaters with the solution temperature ranging from 274° C. to 324° C. depending on the location of the solution in the reactor. Pressure in the flash reactor was controlled by a second RCV.

After leaving the flash reactor, prepolymer formed from the salt solution had an inherent viscosity (I.V.) of 0.2–0.24 dl/g as measured in phenol/tetrachloroethane solvent at 30° C. The polymer was injected directly onto the screws of a twin-screw Model ZSK-30 extruder manufactured by the Werner & Pfleiderer Corporation. An open screw design was used to facilitate vapor removal. A screw speed of 200 rpm was used to maintain minimum fill on the screws. A temperature of 327° C. was maintained in the injection zone with a gradual decline in temperature to 316° C. at the extruder die head. Following the extruder, the polymer strand was passed through a water bath and pelletized. The product I.V. was 0.9 dl/g.

EXAMPLE 2

A polyamide copolymer was prepared from isophthalic acid, adipic acid and metaxylylenediamine in a mole ratio of about 25/75/103 as follows:

To a stainless steel, stirred reactor having a heating oil jacket were added quantities of metaxylylenediamine, water (representing 35% of the total mass charged), isophthalic acid and adipic acid. About 1.3 mol % benzoic acid, based on total moles of diamine and diacids, was added as an endcapping agent. The temperature of the reactor contents was increased during the addition of the diacids from ambient to 70° C. Zinc hypophosphite catalyst at a level of 800 ppm was added to the reactor, after which the reactor was sealed, purged repeatedly with nitrogen, blanketed with a 6.7 kg/cm nitrogen blanket and heated to about 121° C. and maintained at that temperature.

Contents of the reactor were pumped continuously to a jacketed, oil-heated, stirred tank and maintained under a pressure of 16.8 kg/cm therein using a microprocessor-controlled Research Control Valve. The temperature of the liquid phase was maintained at 216° C. Under these conditions, the water content of the solution was decreased in the feed tank from about 35% to about 15% by weight, neglecting water of reaction. The residence time in the tank was about 15 minutes.

The contents of the tank were pumped continuously to and through two jacketed, oil-heated, stainless steel pipes of 0.95 cm inside diameter and lengths of 274 and 401 cm in series, at a rate of about 8 kg/hr using a dual-headed Bran-Lubbe piston pump. The solution contents of the tank being pumped through the pipes was heated to approximately 160° C. by the exit of the first pipe and up to approximately 165° C. by the exit of the second pipe. The pressure inside both pipes was maintained at about 128 kg/cm.

The contents of the second heated pipe were passed continuously through a Research Control Valve to a jacketed tube having a 0.94 cm inside diameter and a 274 cm length equipped with thermocouples to monitor temperatures in the tube and the heating jacket. The pressure of the jacketed tube was maintained at 8.1 kg/cm and 340° C. heat exchange fluid was circulated in the heating jacket.

The contents of the jacketed tube, consisting of water vapor and molten polymer, were introduced continuously onto the twin screws of a Werner & Pfleiderer Corporation ZSK-30 extruder. Volatiles were allowed to escape through a rear vent in the extruder barrel. Polymer was conveyed between screw flights with the screws rotating at 100 rpm and the extruder barrel heated at 300°–316° C.

The polymer melt was then pumped by a gear pump mounted on the end of the extruder through a screen changer and through a strand die 0.24 cm in diameter. The temperature profile in the screen changer was lowered to about 260° C. to allow good strandability. The polymer strands were then passed through a water bath and chopped into pellets with the inherent viscosity of the resulting polyamide of about 0.60 dl/g as measured in a 60/40 phenol/tetrachloroethane solvent at 30° C.

EXAMPLE 3

Copolymers were prepared from adipic acid, isophthalic acid and metaxylylenediamine as follows:

To a jacketed 4CV (helicone reactor of Atlantic Research Corp.) was added, 37.1 parts by weight (pbw) of adipic acid (manufactured by Monsanto Co.), 14.1 pbw of isophthalic acid (IPA-99 manufactured by Amoco Chemical Co.), 1.3 pbw of benzoic acid (manufactured by Monsanto Co.) and 0.001 pbw of sodium hypophosphite catalyst (manufactured by Monsanto Co.) at room temperature. Wash water and water totalling an amount equivalent to 30 pbw was added to the reactor and the agitator was started. The reactor was flushed with nitrogen gas several times and the reactor heating system was started and the reactor was heated to a temperature of 51° C. After the reactor reached a temperature of 51° C., 47.4 pbw of metaxylylenediamine (manufactured by Mitsubishi Gas Chemicals Inc.) was slowly added at a constant rate to the reactor over a five hour period. Water, equivalent to 3.3 pbw, used to wash out the metaxylylenediamine addition equipment was added to the reactor. The reactor was heated and maintained at 135° C. for 30 minutes before nitrogen gas was introduced to the reactor. The reactor was heated to a temperature of 299° C. and held at 299° C. for approximately 45 minutes as water was being removed from the overhead of the reactor. The temperature was reduced slightly and the product was removed from the reactor by stranding the resin product through a water bath and chopper. The polymer reaction product was cooled overnight, ground to a particle size of 5 mm and dried overnight, under partial vacuum conditions, at a temperature of 80°-100° C. The polymer product had an inherent viscosity of 0.9 dl/g as measured in a 60/40 weight ratio of phenol/tetrachloroethane at 30° C. and a glass transition temperature of 100° C.

Oxygen barrier properties were obtained from thin films obtained from intermediate layers of multilayer bottles prepared by coinjection molding of parisons having a layer of the polyamide prepared in this Example 3 between layers of PET using an ASB 250TH machine manufactured by Nissei ASB and determining the oxygen transmission rates on a Modern Control Company Ox-Tran 1000 instrument. A value of 0.55 cc-mil/100 in²-day-atm was obtained for the oxygen transmission rate measured at 23° C., 0% relative humidity and 100% oxygen. Under humid conditions of greater than 80% relative humidity, a value of 0.25 cc-mil/100 in²-day-atm was obtained.

Similar polymer preparation runs and runs at other IA/AA molar ratio compositions with metaxylylenediamine were prepared and films were formed essentially by the procedures given above. The measured I.V.s, Tgs and oxygen transmission rates for these polyamides and films are tabulated in Table 1 below.

TABLE 1

Metaxylylenediamine-containing Polyamides

| Acid Composition, mol % | | I.V. | Tg | Oxygen Transmission Rate |
|---|---|---|---|---|
| Adipic | Isophthalic | dl/g | °C. | cc-mil/100 in²-day-atm |
| 75 | 25 | 0.93 | 99 | 0.60 |
| 85 | 15 | 0.92 | 92 | 0.44 |
| 93 | 7 | 2.32 | 85 | 0.20 |

EXAMPLE 4

A polyamide copolymer was prepared from adipic acid, isophthalic acid, terephthalic acid, metaxylylenediamine and hexamethylenediamine in a mole ratio of about 25/15/10/25/25 as follows:

To a laboratory resin kettle equipped with an agitator and vacuum condenser was added, 25.7 pbw of adipic acid, 17.6 pbw of isophthalic acid, 11.7 pbw of terephthalic acid and 0.001 pbw of sodium hypophosphite catalyst at room temperature. An amount of water equivalent to 35.2 pbw of the reactants was added to the reactor and the stirrer was started and operated at 200 rpm. The reactor was flushed several times with nitrogen and the heating system was started and the reactor heated to 64° C. After the reactor reached a temperature of 64° C., 24.2 pbw of metaxylylenediamine and 20.7 pbw of hexamethylenediamine were slowly added over a 17 minute period. A small amount of water was used to flush the residual diamines from the addition funnel and this water was added to the reactor. The reactor was heated to 290°-300° C. and a nitrogen purge was introduced to the reactor to strip the water overhead. The water was removed over a period of 1 and ½ hours and the reactor contents became a clear melt. The reactor contents were heated at 290°-300° C. for an additional 1 and ½ hours. The stirrer and heating were shut off and the polymer was removed from the resin kettle while still hot and placed on aluminum foil to cool overnight. The polymer was ground to a particle size of 5 mm, dried overnight under partial vacuum conditions, at a temperature of 80°-100° C. The polymer product had an inherent viscosity of 0.79 dl/g measured in a 60/40 weight ratio of phenol/tetrachloroethane solvent at 30° C. and a Tg of 100° C. The polymer product was used to prepare a compression molded film on a Pasadena Hydraulics, Inc., Model S100R-2376 100-ton press. One-half inch hardened steel ground to a 1-mil tolerance in thickness was used for platens to press out thin films. The films were measured for oxygen transmission rate with a value of 1.61 cc-mil/100 in²-day-atm obtained, measured at 23° C. and 100% oxygen with a Modern Control Company Ox-Tran 1000 instrument.

EXAMPLE 5

Films were prepared and oxygen transmission rates determined on these films for a MXDA resin, an amorphous polyphthalamide, the copolymer of Example 4 and blends of MXDA resin/amorphous polyphthalamide as follows:

Films of a MXDA resin, the amorphous polyphthalamide (APA) of Example 1, the copolymer of Example 4 and blends of MXDA resin/APA having dimensions of 4 inch by 4 inch were prepared by extrusion. The APA and blends using APA used the APA of Example 1 which had a molar ratio of 30/20/50 for IA/TA/HMDA. The MXDA resin and blends using MXDA resin used a T-600 MXD6 resin of the Toyobo Company having a molar ratio of 50/50 for AA/MXDA. The copolymer of Example 4 had a molar ratio of 25/15/10/25/25 for AA/IA/TA/MXDA/HMDA, corresponding to a 50/50 weight ratio blend of APA/MXDA resin with APA having a molar ratio of 30/20/50 for IA/TA/HMDA and MXDA resin having a molar ratio of 50/50 for AA/MXDA. The blends of MXDA resin and APA were prepared by adding weighed amounts of MXDA resin and APA into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 2 below together with Tgs.

For purposes of comparison, oxygen transmission rates of films prepared in like manner from the APA and MXDA resin components of the blends were also determined. Table 2 also presents calculated oxygen transmission rates determined by adding the product of the weight fraction of APA for a given blend and the measured oxygen transmission rate for APA film to the product of the weight fraction of MXDA resin for the blend and the measured oxygen transmission rate for MXDA resin film.

TABLE 2

Measured and Calculated Oxygen Transmission Rates

| Composition (weight ratio) | Tg °C. | Oxygen Transmission Rate (cc-mil/100 in²-day-atm) | |
|---|---|---|---|
| | | Measured | Calculated |
| MXDA Resin | 80 | 0.55 | — |
| APA/MXDA Blend (25/75) | 91 | 0.85 | 1.46 |
| APA/MXDA Blend (50/50) | 102 | 1.5 | 2.38 |
| Copolymer | 100 | 1.6 | — |
| APA/MXDA Blend (75/25) | 112 | 2.3 | 3.29 |
| APA | 123 | 4.2 | — |

As can be seen from Table 2, measured oxygen transmission rates for the blend and copolymer compositions of the invention were significantly lower than the values calculated indicating that this property does not follow the rule of mixtures for the invented polyamide blend compositions.

EXAMPLE 6

Films were prepared and oxygen transmission rates determined on these films for blends of MXDA resin/amorphous polyphthalamide as follows:

Films of MXDA resin, blends of MXDA resin/amorphous polyphthalamide and amorphous polyphthalamide were prepared by extrusion with the blends formed by the procedure given in Example 5. The MXDA resin was T-600 MXD6 resin of the Toyobo Company. The amorphous polyphthalamide was Selar PA 3426, an amorphous polyamide manufactured by E. I. DuPont de Nemours and Company, having a molar ratio of about 35/15/50 for IA/TA/HMDA. Blends of MXDA resin and APA were prepared by adding weighed amounts of MXDA resin and APA into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 3 below together with Tgs.

For purposes of comparison, oxygen transmission rates of films prepared in like manner from the Selar PA and MXDA resin components of the blends were also determined. Table 3 also presents calculated oxygen transmission rates determined by adding the product of the weight fraction of Selar PA for a given blend and the measured oxygen transmission rate for Selar PA film to the product of the weight fraction of MXDA resin for the blend and the measured oxygen transmission rate for MXDA resin film.

TABLE 3

Measured and Calculated Oxygen Transmission Rates

| Composition (weight ratio) | Tg °C. | Oxygen Transmission Rate (cc-mil/100 in2-day-atm) | |
|---|---|---|---|
| | | Measured | Calculated |
| MXDA Resin | 80 | 0.55 | — |
| Selar PA/MXDA Blend (25/75) | 90 | 0.96 | 1.36 |
| Selar PA/MXDA Blend (50/50) | 100 | 1.5 | 2.18 |
| Selar PA/MXDA Blend (75/25) | 100 | 2.3 | 2.99 |
| Selar PA | 120 | 3.8 | — |

As can be seen from Table 3, measured oxygen transmission rates for the blend and copolymer compositions of the invention were significantly lower than the values calculated indicating that this property does not follow the rule of mixtures for the invented polyamide blend compositions.

EXAMPLE 7

Films of an MXDA resin, blends of an MXDA resin/amorphous polyphthalamide and an amorphous polyphthalamide were prepared by extrusion with the blends prepared by the procedure given in Example 5. The MXDA resin was T-600 MXD6 resin of the Toyobo Company. The amorphous polyphthalamide was Nydur T40, manufactured by Bayer, having a molar ratio of isophthalic acid/hexamethylenediamine of 50/50. The blends of MXDA resin and Nydur T40 were prepared by adding weighed amounts of MXDA resin and Nydur T40 into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 4 below, together with Tgs. Calculated oxygen transmission rates for the blends were determined by adding the product of the weight fraction of Nydur T40 for a given blend and the measured oxygen transmission rate for Nydur T40 film to the product of the weight fraction of MXDA resin of the blend and the measured oxygen transmission rate for MXDA resin film.

TABLE 4

Measured and Calculated Oxygen Transmission Rates

| Composition (weight ratio) | Tg °C. | Oxygen Transmission Rate (cc-mil/100 in2-day-atm) | |
|---|---|---|---|
| | | Measured | Calculated |
| MXDA Resin | 80 | 0.60 | — |
| Nydur T40/MXDA Blend (25/75) | 91 | 0.89 | 1.18 |
| Nydur T40/MXDA Blend (50/50) | 101 | 1.23 | 1.77 |
| Nydur T40/MXDA Blend (75/25) | 112 | 1.86 | 2.35 |
| Nydur T40 | 122 | 2.93 | — |

As with the blends of Example 5, containing an APA component having a molar ratio of 30/20/50 for IA/TA/HMDA, the blends of this example with a molar ratio of 50/50 for IA/HMDA for the APA had better oxygen transmission rates than the calculated values.

EXAMPLE 8

Films of Trogamid T, an amorphous polyamide of terephthalic acid and trimethylhexamethylenediamine; nylon 610, a semicrystalline aliphatic polyamide; a 50/50 weight/weight blend of Trogamid T/nylon 610 and a 50/50 weight/weight blend of Trogamid T/MXD6 were prepared by extrusion and oxygen transmission rates of these unoriented films were determined on a Modern Control Company Ox-Tran 1000 instrument at 23° C., 100 percent oxygen and 0 percent relative humidity. Trogamid T was manufactured by Huls America, Inc. Nylon 610 was manufactured by BASF, Inc., and MXD6 was manufactured by Toyobo Company. The measured oxygen transmission rates are given in Table 5 below, together with Tgs for composition in which Tgs were determined.

TABLE 5

Measured Oxygen Transmission Rates

| Composition (weight ratio) | Tg °C. | Oxygen Transmission Rate (cc-mil/100 in2-day-atm) Measured |
|---|---|---|
| nylon 610 | — | 17.2 |
| Trogamid T/nylon 610 (50/50) | — | 19.2 |
| Trogamid T | 152 | 10.9 |
| Trogamid T/MXD6 (50/50) | 138 | 2.7 |

As can be seen from the tabulated oxygen transmission rates in Table 5, not all blends of amorphous polyamides and semicrystalline polyamides give oxygen transmission rates which are better than the calculated values from the rules of mixtures. For the materials used in Example 8 as a comparative example, Trogamid T and nylon 610, the blend oxygen transmission rate is higher than either of the blend components whereas a blend of Trogamid T/MXD6 which is representative of the polyamide compositions of the present invention shows the unexpected improvement in oxygen transmission rate.

EXAMPLES 9-11

Example 9 is a control example in which a monolayer vessel in the form of a 12 fluid ounce round container was blow-molded on an ASB 250TH machine manufactured by Nissei ASB using Goodyear 7207 PET resin.

Example 10 was a multilayer vessel prepared in the form of 12 fluid ounce round containers and blow-molded on an ASB 250TH machine manufactured by Nissei ASB with PET resin for the outer and inner layers and a blend of MXDA resin and an amorphous polyphthalamide in a weight ratio of 50/50 for the middle layer. The MXDA resin was T-600 MXD6 resin of the Toyobo Company. The amorphous polyphthalamide was the copolymer of Example 1 having a molar ratio of 30/20/50 for isophthalic acid/terephthalic acid/hexamethylenediamine. The PET resin was Goodyear 7207.

Example 11 was a multilayer vessel prepared in the form of 12 fluid ounce round containers and blow-molded on an ASB 250TH machine manufactured by Nissei ASB with PET resin for the outer and inner layers and a blend of MXDA resin and an amorphous polyphthalamide in a weight ratio of 50/50 for the middle layer. The MXDA resin was T-600 MXD6 resin of the Toyobo Company. The amorphous polyphthalamide was an amorphous polyamide of Dupont, Selar PA 3426, an isophthalic acid/terephthalic acid/hexamethylenediamine copolymer in a molar ratio of 35/15/50. The PET resin was Goodyear 7207. Physical and oxygen transmission properties determined for the bottles are tabulated in Table 6 below.

TABLE 6

Bottle Physical and Oxygen Transmission Properties

| | Example | | |
|---|---|---|---|
| | 9 | 10 | 11 |
| Weight, gm | 30.8 | 30.6 | 30.7 |
| Thickness, mil | | | |
| Average wall | 18.6 | 17.4 | 17.6 |
| Middle Layer | 0 | 2.2 | 1.5 |
| Oxygen Transmission cc/pkg/day | 0.027 | 0.009 | 0.0085 |

As is clear from the results of Table 6, the bottles of Examples 10 and 11 have remarkably improved oxygen transmission properties in comparison with Example 9, a bottle with PET alone.

EXAMPLES 12-14

Vessels in the form of 12 fluid ounce round containers were blow-molded on an ASB 250TH machine manufactured by Nissei ASB.

Example 12 is a control example in which Example 9 was repeated to prepare monolayer vessels in the form of 12 fluid ounce round containers blow-molded on an ASB 250TH machine manufactured by Nissei ASB with Goodyear 7207 PET resin.

Example 13 also is a control example in which multilayer vessels prepared in the form of 12 fluid ounce round containers were blow-molded on an ASB 250TH machine manufactured by Nissei ASB with PET resin for the outer and inner layers and MXDA resin for the intermediate layer. The MXDA resin was T-600 MXD6 resin of the Toyobo Company. The PET resin was Goodyear 7207.

Example 14 was multilayer vessels prepared in the form of 12 fluid ounce round containers blow-molded on an ASB 250TH machine manufactured by Nissei ASB with PET resin for the outer and inner layers and a blend composition according to this invention of MXDA resin and an amorphous polyphthalamide in a weight ratio of 50/50 for the middle layer. The MXDA resin was T-600 MXD6 resin of the Toyobo Company. The amorphous polyamide was Selar PA 3426. The PET resin was Goodyear 7207 grade as used in Example 9. Physical and oxygen transmission properties determined for the bottles are tabulated in Table 7.

TABLE 7

Bottle Physical and Oxygen Transmission Properties

| | Example | | |
|---|---|---|---|
| | 12 | 13 | 14 |
| Weight, gm | 30.7 | 30.5 | 30.4 |
| Thickness, mil | | | |
| Average wall | 20.6 | 17.9 | 18.2 |
| Middle Layer | 0 | 1.6 | 1.2 |
| Oxygen Transmission cc/pkg/day | 0.024 | 0.009 | 0.017 |

As is clear from the results presented in Table 7, the bottles of Example 14 have improved oxygen transmission properties compared to Example 12 and are intermediate between Example 12 and Example 13, which has a thicker middle layer of the MXD6 polymer.

EXAMPLE 15

Multilayer containers in the form of 10 ounce round bottles were blow-molded on an ASB 250TH machine manufactured by Nissei ASB. The inner and outer layers were PET and the intermediate layer was T-600 MXD6 resin of the Toyobo Company and an amorphous polyamide Selar PA 3426 blended in a weight ratio of 50/50. Several of these bottles and bottles made with a middle layer of only MXD6 resin were filled with water, capped and placed in an oven maintained at a temperature of 38° C. and a relative humidity of 90%. After 48 hours of storage in the oven at 38° C., loss of clarity in the bottles that had MXD6 in the middle layer was observed in the form of a severe haze or "whitening" effect in the bottle walls. The bottles which contained the blend of MXD6 and Selar PA 3246 were unaffected and remained clear.

COMPARATIVE EXAMPLE

Multilayer containers in the form of 8 ounce oval bottles were blow-molded on an ASB 250TH machine manufactured by Nissei ASB. The inner and outer layers were PET and the middle layer was T-600 MXD6 resin of the Toyobo Company. Seven of these bottles with the middle layer varying in thickness between 5 and 14 percent of the total bottle wall thickness were filled with water, capped and placed in an oven maintained at a temperature of 38° C. After 48 hours of storage in the oven at 38° C., loss of clarity in the bottles was observed in the form of a haze or "whitening" effect in the bottle walls. The severity of the haze corresponded to the thickness of the middle layer with a slight haze at the 5% middle wall thickness to a severe haze at the 14% middle wall thickness.

We claim:

1. A plastic bottle having a wall structure comprising a layer of a polyamide composition comprising the following recurring units:

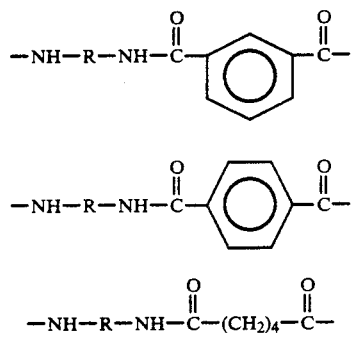

in proportions such that the mole ratio of the dicarboxylic acid moieties in the A, B and C units is about 49.5–0.5/0–20/0.5–49.5 and wherein R is a divalent radical comprising

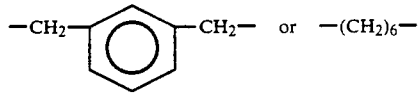

provided that said radicals

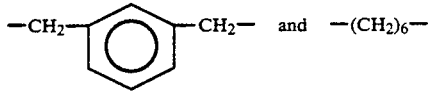

are present in the A, B and C units in a mole ratio of about 0.5–50/49.5–0.

2. The plastic bottle according to claim 1 wherein the polyamide composition comprises a copolymer of isophthalic acid, terephthalic acid, adipic acid, metaxylylenediamine and hexamethylenediamine.

3. The plastic bottle according to claim 1 wherein the polyamide composition comprises a copolymer of isophthalic acid, adipic acid and metaxylylenediamine.

4. The plastic bottle according to claim 3 wherein the mole ratio of dicarboxylic acid moieties in said A and C units is about 5–15/45–35.

5. The plastic bottle according to claim 1 wherein the polyamide composition comprises a miscible blend of about 99 to about 1 weight percent of an amorphous polyphthalamide comprising isophthalic acid, terephthalic acid and hexamethylenediamine moieties in a molar ratio of about 50–27.5/0–22.5/50 and about 1 to about 99 weight percent of a metaxylylenediamine-containing polyamide comprising adipic acid, isophthalic acid and metaxylylenediamine moieties in a molar ratio of about 50–35/0–15/50.

6. The plastic bottle according to claim 5 wherein said miscible blend comprises about 75 to about 25 weight percent of said amorphous polyphthalamide and about 25 to about 75 weight percent of said metaxylylenediamine-containing polyamide.

7. The plastic bottle according to claim 5 wherein said miscible blend comprises about 60 to about 40 weight percent of said amorphous polyphthalamide and about 40 to about 60 weight percent of said metaxylylenediamine-containing polyamide.

8. The plastic bottle according to claim 1 wherein said wall structure is a multilayer structure comprising an inner layer and an outer layer comprising a thermoplastic resin, and at least one intermediate layer comprising said polyamide composition.

9. The plastic bottle according to claim 8 wherein said intermediate layer has a wall thickness of about 4 to about 60 percent of the total wall thickness.

10. The plastic bottle accirding to claim 9 wherein the wall thickness of the intermediate layer is about 5 to about 20 percent of the total wall thickness.

11. The plastic bottle according to claim 8 wherein the thermoplastic resin has repeating units consisting predominantly of ethylene terephthalate and the inherent viscosity thereof is 0.55 or more.

12. The plastic bottle according to claim 8 wherein the thermoplastic resin is polycarbonate.

13. The plastic bottle according to claim 8 wherein the polyamide composition comprises a copolymer of isophthalic acid, terephthalic acid, adipic acid, metaxylylenediamine and hexamethylenediamine in a molar ratio of about 49.5–0.5/0–20/0.5–49.5/0.5–50/49.5–0.

14. A plastic bottle having a multi-ply wall structure of an inner layer and an outer layer of a thermoplastic resin and at least one intermediate layer of a polyamide composition comprising the following recurring units:

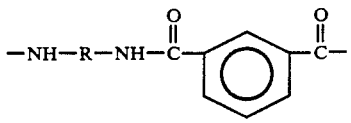

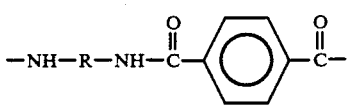

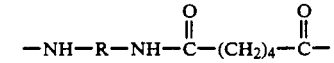

in proportions such that the mole ratio of the dicarboxylic acid moieties in the A, B and C units is about 37.5–5/0–15/12.5–37.5 and wherein R is a divalent radical comprising

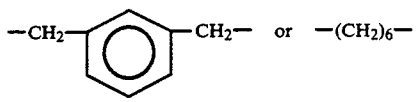

provided that said radicals

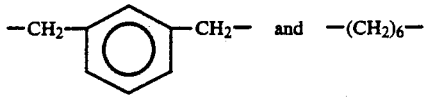

are present in the units A, B and C in a mole ratio of about 37.5–12.5/12.5–37.5 and said polyamide composition has a glass transition temperature of 90° C. or greater and an oxygen transmission rate of about 2.0 cc-mil/100 in²-day-atm or less.

15. The plastic bottle according to claim 14 wherein the metaxylylenediamine-containing polyamide comprises a copolymer of adipic acid, isophthalic acid and metaxylylenediamine in a molar ratio of about 50–35-/0–15/50.

16. The plastic bottle according to claim 15 wherein the metaxylylenediamine-containing polyamide comprises a homopolymer of adipic acid and metaxylylenediamine in a molar ratio of about 50/50.

17. The plastic bottle according to claim 14 wherein the amorphous polyphthalamide comprises a copolymer of isophthalic acid, terephthalic acid and hexamethylenediamine in a molar ratio of about 50–27.5-/0–25.5/50.

18. The plastic bottle according to claim 17 wherein the amorphous polyphthalamide comprises a copolymer of isophthalic acid, terephthalic acid and hexamethylenediamine in a molar ratio of about 30/20/50.

19. A plastic bottle produced by a process comprising forming a multilayer parison having a multi-ply structure of an inner layer and an outer layer of a thermoplastic resin and at least one intermediate layer of a polyamide composition comprising the following recurring units:

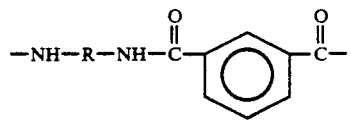

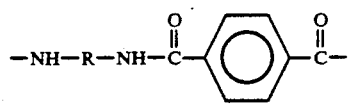

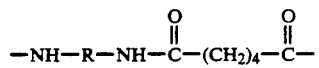

in proportions such that the mole ratio of the dicarboxylic acid moieties in the A, B and C units is about 37.5–5/0–15/12.5–37.5 and wherein R is a divalent radical comprising

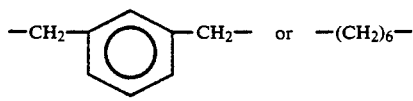

provided that said radicals

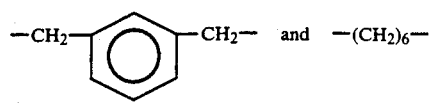

are present in the units A, B and C in a mole ratio of about 37.5–12.5/12.5–37.5 and said polyamide composition has a glass transition temperature of 90° C. or greater and an oxygen transmission rate of about 2.0 cc-mil/100 in²-day-atm or less, and blow-molding the multilayer parison thus-formed at a draw ratio of 1.1 to 3.0 times in longitudinal direction.

20. The plastic bottle produced by the process according to claim 19 wherein the polyamide composition comprises a miscible blend of about 75 to about 25 weight percent of an amorphous polyphthalamide comprising isophthalic acid, terephthalic acid and hexamethylenediamine moieties in a molar ratio of about 50–27.5/0–22.5/50 and about 25 to about 75 weight percent of a metaxylylenediamine-containing polyamide comprising adipic acid, isophthalic acid and metaxylylenediamine moieties in a molar ratio of about 50–35-/0–15/50.

21. The plastic bottle produced by the process according to claim 20 wherein the amorphous polyphthalamide comprises a copolymer of isophthalic acid, terephthalic acid and hexamethylenediamine in a molar ratio of about 30/20/50.

22. The plastic bottle produced by the process according to claim 20 wherein the metaxylylenediamine-containing polyamide comprises a copolymer of adipic acid, isophthalic acid and metaxylylenediamine in a molar ratio of about 45–35/5–15/50.

23. The plastic bottle produced by the process according to claim 20 wherein the metaxylylenediamine-containing polyamide comprises a homopolymer of adipic acid and metaxylylenediamine in a molar ratio of about 50/50.

24. A process for producing a plastic bottle comprising forming a multilayer parison having a multi-ply structure of an inner layer and an outer layer comprising a thermoplastic resin and at least one intermediate layer of a polyamide composition comprising the following recurring units:

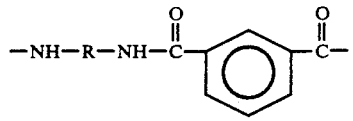

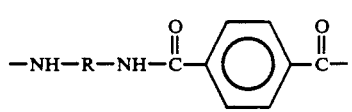

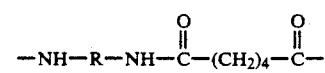

in proportions such that the mole ratio of the dicarboxylic acid moieties in the A, B and C units is about 49.5–0.5/0–20/0.5–49.5 and wherein R is a divalent radical comprising

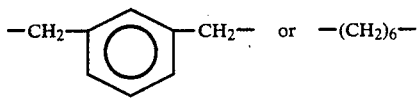

provided that said radicals

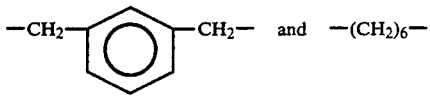

are present in the A, B and C units in a mole ratio of about 0.5–49.5/49.5–0, and preheating and blow-molding the multilayer parison thus-formed at a temperature from about 90° to about 150° C. and a draw ratio of 1.1 to 3.0 times in longitudinal direction.

25. The process according to claim 24 wherein the thermoplastic polyester resin has repeating units consisting predominantly of ethylene terephthalate and the inherent viscosity thereof is 0.55 or more.

26. The process according to claim 24 wherein the polyamide composition comprises a copolymer of isophthalic acid, terephthalic acid, adipic acid, metaxylylenediamine and hexamethylenediamine in a molar ratio of about 37.5–5/0–15/12.5–37.5/37.5–12.5/12.5–37.5.

27. The process according to claim 24 wherein the polyamide composition comprises a copolymer of isophthalic acid, terephthalic acid, adipic acid, metaxylylenediamine and hexamethylenediamine in a molar ratio of about 30–5/0–15/15–30/30–20/20–30.

28. The process according to claim 24 wherein the polyamide composition comprises a miscible blend of about 60 to about 40 weight percent of an amorphous polyphthalamide comprising isophthalic acid, terephthalic acid and hexamethylenediamine moieties in a molar ratio of about 50–27.5/0–22.5/50 and about 40 to about 60 weight percent of a metaxylylenediamine-containing polyamide comprising adipic acid, isophthalic acid and metaxylylenediamine moieties in a molar ratio of about 50–35/0–15/50.

29. The process according to claim 28 wherein the amorphous polyphthalamide comprises a copolymer of isophthalic acid, terephthalic acid and hexamethylenediamine in a molar ratio of about 30/20/50.

30. The process according to claim 28 wherein the metaxylylenediamine-containing polyamide comprises a copolymer of adipic acid, isophthalic acid and metaxylylenediamine in a molar ratio of about 45–35/5–15/50.

31. The process according to claim 28 wherein the metaxylylenediamine-containing polyamide comprises a homopolymer of adipic acid and metaxylylenediamine in a molar ratio of about 50/50.

* * * * *